(12) United States Patent
Lindberg et al.

(10) Patent No.: US 10,284,616 B2
(45) Date of Patent: *May 7, 2019

(54) ADJUSTING A MEDIA STREAM IN A VIDEO COMMUNICATION SYSTEM BASED ON PARTICIPANT COUNT

(71) Applicant: Google Inc., Mountain View, CA (US)

(72) Inventors: Jonas Erik Lindberg, Stockholm (SE); Justin Russell Uberti, Kirkland, WA (US); David Scrymgeour Bennett, Issaquah, WA (US)

(73) Assignee: Google LLC, Mountain View, CA (US)

( * ) Notice: Subject to any disclaimer, the term of this patent is extended or adjusted under 35 U.S.C. 154(b) by 731 days.

This patent is subject to a terminal disclaimer.

(21) Appl. No.: 14/466,016

(22) Filed: Aug. 22, 2014

(65) Prior Publication Data

US 2014/0365620 A1    Dec. 11, 2014

Related U.S. Application Data

(63) Continuation of application No. 13/526,148, filed on Jun. 18, 2012, now Pat. No. 8,832,193.

(60) Provisional application No. 61/497,904, filed on Jun. 16, 2011.

(51) Int. Cl.
*G06F 15/16* (2006.01)
*H04L 29/06* (2006.01)
*H04N 7/14* (2006.01)
*H04L 29/08* (2006.01)

(52) U.S. Cl.
CPC .............. *H04L 65/60* (2013.01); *H04L 67/10* (2013.01); *H04N 7/147* (2013.01)

(58) Field of Classification Search
CPC ... H04L 12/1827; H04L 65/60; H04L 65/601; H04L 65/605; H04L 67/10; H04N 7/147; H04N 7/15
See application file for complete search history.

(56) References Cited

U.S. PATENT DOCUMENTS

| 6,453,336 | B1 * | 9/2002 | Beyda ..................... H04L 29/06 709/204 |
| 6,680,745 | B2 * | 1/2004 | Center, Jr. ............. H04N 7/148 348/14.08 |
| 6,795,106 | B1 * | 9/2004 | Cooper .................. H04N 7/147 348/14.07 |
| 8,217,985 | B2 | 7/2012 | Stoen et al. |

(Continued)

*Primary Examiner* — Lance Leonard Barry
(74) *Attorney, Agent, or Firm* — IP Spring

(57) ABSTRACT

An example method includes receiving, by the computing device, a first video stream from a first client device of a plurality of client devices, wherein the computing device is communicatively coupled to each client device of the plurality of client devices. The method further includes detecting a participant count associated with the first client device based on the first video stream from the first client device and based on the participant count associated with the first client device, adjusting the first video stream. The method further includes receiving a second video stream from a second client device of the plurality of client devices and adjusting at least one of video stream display size or video stream resolution of the second video stream. The method further includes sending the adjusted first video stream and the adjusted second video stream to at least one client device of the plurality of client devices.

18 Claims, 5 Drawing Sheets

(56) References Cited

U.S. PATENT DOCUMENTS

| | | | | |
|---|---|---|---|---|
| 8,300,082 | B2* | 10/2012 | Malik | H04L 12/1818 |
| | | | | 348/14.08 |
| 8,576,271 | B2* | 11/2013 | Moore | H04N 7/15 |
| | | | | 348/14.01 |
| 8,832,193 | B1* | 9/2014 | Lindberg | H04L 65/60 |
| | | | | 348/14.12 |
| 2002/0126201 | A1* | 9/2002 | Schmitt | H04N 7/152 |
| | | | | 348/14.09 |
| 2003/0220971 | A1* | 11/2003 | Kressin | H04L 12/1822 |
| | | | | 709/204 |
| 2005/0099492 | A1 | 5/2005 | Orr | |
| 2009/0262206 | A1* | 10/2009 | Park | G08B 13/19641 |
| | | | | 348/218.1 |
| 2009/0303311 | A1* | 12/2009 | Stoen | H04N 7/147 |
| | | | | 348/14.08 |
| 2010/0188477 | A1* | 7/2010 | Derocher | H04L 12/1827 |
| | | | | 348/14.09 |
| 2012/0314015 | A1* | 12/2012 | Watson | H04N 7/15 |
| | | | | 348/14.1 |

* cited by examiner

ADJUSTING A MEDIA STREAM IN A VIDEO COMMUNICATION SYSTEM BASED ON PARTICIPANT COUNT

RELATED APPLICATIONS

This application is a continuation of U.S. application Ser. No. 13/526,148, entitled "Adjusting A Media Stream in a Video Communication System," and filed on Jun. 18, 2012 (now issued as U.S. Pat. No. 8,832,193), which claims the benefit of U.S. Application No. 61/497,904, entitled "Management of Media Streaming in a Communication System," and filed on Jun. 16, 2011, both of which are incorporated herein by reference in their entirety.

TECHNICAL FIELD

This disclosure relates generally to video communication systems.

BACKGROUND

In a video conferencing system, two or more participants utilize client devices to stream media among the participants. Each participant may have access to a client device that captures media (e.g., video, audio, etc.), and sends the captured media as a media stream to other participants. Participants may use various types of client devices to receive one or more media streams. Each receiving client device may output the media streams (e.g., display video, play audio, etc.) to one or more participants at the client device's location.

SUMMARY

In one aspect, this disclosure is directed to a method performed by a computing device having at least one processor. The method includes receiving, by the computing device, a video stream from a first client device of a plurality of client devices, wherein the computing device is communicatively coupled to each client device of the plurality of client devices. The method further includes detecting, by the computing device, one or more conditions associated with the first client device and adjusting, by the computing device, the received video stream based at least in part on the detected one or more conditions. The method further includes sending, by the computing device, the adjusted video stream to at least a second client device of the plurality of client devices.

In another aspect, this disclosure is directed to a method performed by a computing device having at least one processor. The method includes receiving, by the computing device, a video stream from a first client device of a plurality of client devices, wherein the computing device is communicatively coupled to each client device of the plurality of client devices. The method further includes detecting, by the computing device, one or more conditions associated with a second client device of the plurality of client devices and adjusting, by the computing device, the received video stream based at least in part on the detected one or more conditions. The method further includes sending, by the computing device, the adjusted video stream to at least the second client device.

In another aspect, this disclosure is directed to a method performed by a computing device having at least one processor. The method includes capturing, using at least one video capture device coupled to the computing device, video data associated with one or more participants at a site associated with the computing device. The method further includes generating, by the computing device, a video stream based at least in part on the captured video data, detecting, by the computing device, one or more conditions associated with the site, and adjusting, by the computing device, the generated video stream based at least in part on the detected one or more conditions. The method further includes sending the adjusted video stream to a server that is communicatively coupled to the computing device.

In another aspect, this disclosure is directed to a method performed by a computing device having at least one processor. The method includes receiving, using a network interface coupled to the computing device, a video stream from a server, and detecting, by the computing device, one or more properties of the received video stream. The method further includes adjusting, by the computing device, the received video stream based at least in part on the detected one or more properties, and outputting, using a display device coupled to the computing device, the adjusted video stream.

In another aspect, this disclosure is directed to a computer-readable storage medium that includes instructions that, when executed, cause one or more programmable processors of a computing device to perform operations. The operations include receiving, by the computing device, a video stream from a first client device of a plurality of client devices, wherein the computing device is communicatively coupled to each client device of the plurality of client devices. The operations further include detecting, by the computing device, one or more conditions associated with the first client device and adjusting, by the computing device, the received video stream based at least in part on the detected one or more conditions. The operations further include sending, by the computing device, the adjusted video stream to at least a second client device of the plurality of client devices.

In another aspect, this disclosure is directed to a device. The device includes one or more processors, and a network interface operable to receive a video stream from a first client device of a plurality of client devices, wherein the computing device is communicatively coupled to each client device of the plurality of client devices and operable to send an adjusted stream to at least a second client device of the plurality of client devices. The device further includes a video management module operable to detect one or more conditions associated with the first client device and operable to adjust the received video stream based at least in part on the detected one or more conditions to form the adjusted video stream.

The details of one or more implementations of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present disclosure. Like reference characters denote like elements throughout the figures and text.

DETAILED DESCRIPTION

Figure 1:
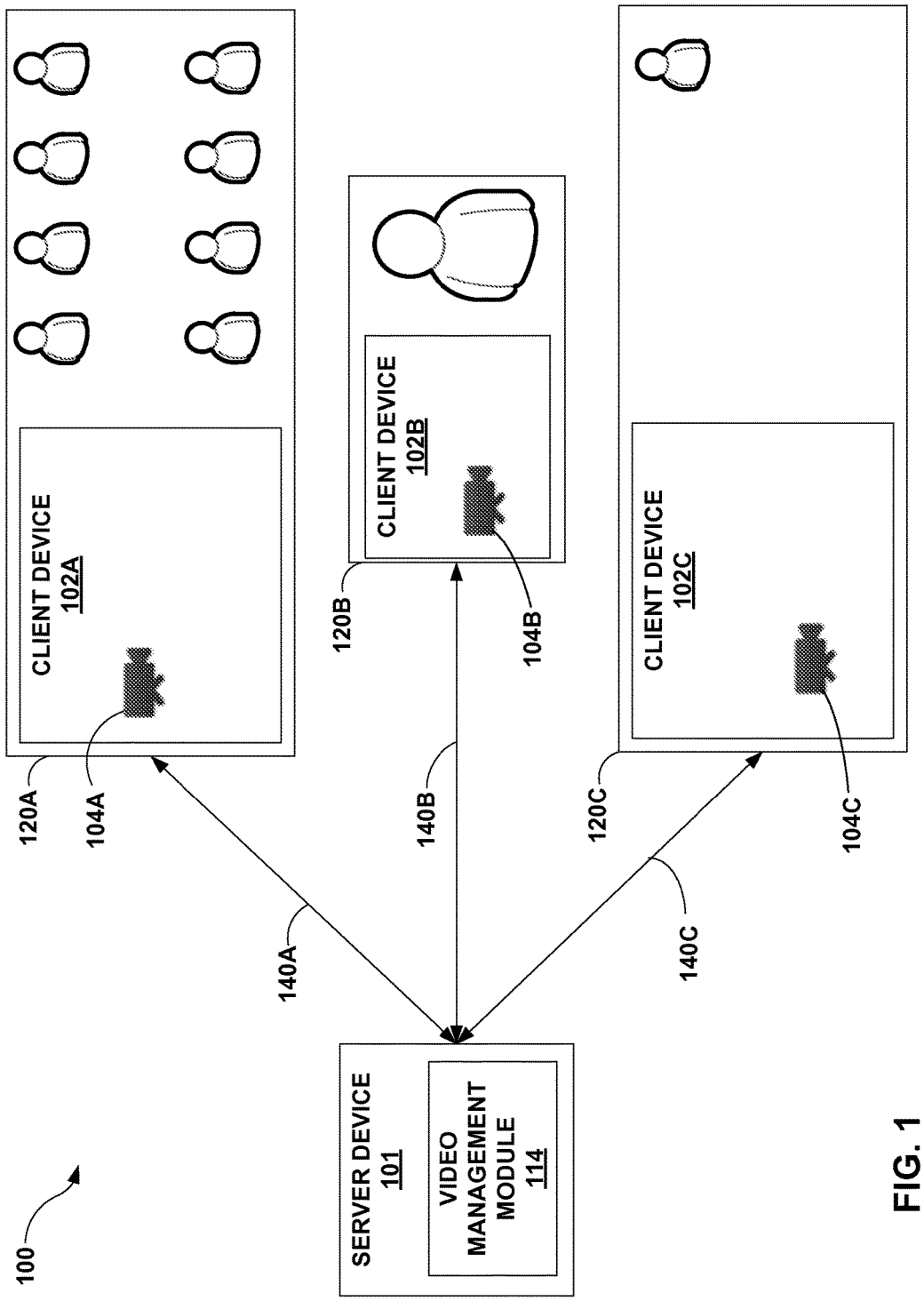
FIG. 1 is a block diagram illustrating a system in which a server hosts a virtual meeting between participants at three distinct locations, in accordance with one or more aspects of this disclosure.

In general, this disclosure describes techniques for managing media streaming among users in a video conferencing system. The video conferencing system may be a web-based media exchange system. In some examples, the management of media streaming may optimize usage of the available bandwidth in the system. The video conferencing system may include a client device, which may be one or more devices capable of capturing media associated with the participant and processing the captured media for streaming to other client devices. The client devices may be devices such as computing devices that incorporate media capabilities. The media stream may include one or more communication elements, such as a video stream, audio stream, file transfer, text-based chat, etc. Additionally, one or more servers may manage the media streams from all participants in the video conference. The one or more servers also manage other aspects of the video conferencing system, such as document exchange. The techniques of this disclosure may be implemented by the client devices and/or by the server.

In one aspect of this disclosure, a server system may dynamically adjust the display size and the video resolution during a video conferencing session. The adjustment may be based on detected conditions associated with the client device sending the video stream and/or the client device receiving the video stream. Some example conditions may be the number of participants at the location associated with the sending client device, size of the location associated with the sending client device, and distance between the participants and the sending client device.

In another aspect of these techniques, a client device may adjust the size of the media stream to adapt to limitations on the bandwidth of the connection over which the client device communicates the media stream to other client devices. The adjustment to the media stream may be based on limitations or conditions associated with the receiving client devices in the system. As one example, the server may adjust the audio portion of the stream from each of the client devices to optimize the bandwidth. The server may determine whether an audio from a client device is background noise or sound corresponding to a speaker, forward, to other client devices, audio that represents speech, and withhold audio that represents background noise. The system may also provide automatic gain control, such that all participants receive audio at the same level, which allows the server to more effectively compare the audio from the different participants. In one example, if multiple participants are sending speech, the server may determine which one to forward based on a characteristic of the audio, such as the amplitude (volume) of the audio associated with each user.

In another aspect of these techniques, a client device may also determine the path via which it sends the media stream to other client devices. In one example, a client device may use peer-to-peer media streaming, when sending peer-to-peer is more bandwidth-efficient than sending the media stream through the server. In another example, a client device may send the media stream through the server and regional reflectors to minimize the distance the media stream travels, therefore minimizing degradation and/or delays. In one example, a client device may utilize regional and interconnected reflectors to optimize bandwidth usage and minimize degradation and/or delays.

FIG. 1 is a conceptual diagram illustrating a server that hosts a virtual meeting between participants at three distinct locations, in accordance with one or more aspects of this disclosure. In the example of FIG. 1, server device 101 may host a virtual meeting between participants at first location 120A, second location 120B, and third location 120C (collectively, "locations 120"). A respective one of client devices 102A-102C (collectively, "client devices 102") is physically located at a respective one of locations 120. Examples of client devices 102 include computers, tablets, phones, and Google-TV-like devices, including televisions with one or more processors attached thereto or embedded therein. Client devices 102 may be equipped with input devices capable of capturing various types of media, such as still cameras, video cameras (e.g., webcams), microphones, text entry devices, etc.

In the example of FIG. 1, first location 120A hosts a total of eight participants, while second location 120B and third location 120C each hosts a single participant. For purposes of illustration only, client device 102B at second location 120B may be a mobile computing device equipped with at least one camera, such as a smartphone, tablet computer, etc. Similarly, for ease of discussion, each of first location 120A and third location 120C may be presumed to conference rooms capable of hosting multiple participants. The conference rooms may be equipped with tools necessary to participate in a virtual meeting (e.g., a video conference), including one or more video cameras, video display(s), audio speaker(s), etc.

A server device 101 may execute with multiple processors, may have functionality distributed across multiple machines, etc. Server device 101 may also execute as a virtual machine executing on underlying hardware (which itself may be a single or multiple machines). Server device 101 may also execute as a process, or a set of processes, on a cloud server or service.

Server device 101 may utilize video management module 114 to implement techniques of this disclosure to adjust the size and/or resolution of video streams received from locations 120 based on various characteristics of each location. For example, video management module 114 may apply well-known face detection techniques to determine that eight participants are at first location 120A. In some implementations, video management module 114 may detect the distance from video camera 104A (of client device 102A) to one or more of the eight participants in the conference room. Video management module 114 may discern the distance between the video camera and each participant in various ways, such as extrapolating the distance based on the size of each participant's face in video stream 140A, etc.

Based at least in part on the detected number of participants at a location, and/or the distance between a particular video camera and each corresponding participant, video management module 114 may adjust the size and/or resolution of a received video feed before distributing the received video feed to the remaining locations/client devices. For example, video management module 114 may enhance one or both of the display size and the resolution of video stream 140A received from first location 120A. More specifically, video management module 114 may determine that first location 120A currently hosts eight participants (e.g., using face detection technology). Based on the detection of eight participants at first location 120A, video management module 114 may determine that video stream 140A warrants a greater display size and resolution than one or both of video streams 140B and 140C, in order for other participants to properly view the eight participants at first location 120A. For example, the greater display size and resolution may help a viewer more clearly discern gestures, facial expressions, etc. of those participants at first location 120A who are seated farthest away from video camera 104A of client device 102A.

In some implementations, server device 101 may identify an active participant (or a participant who "has the floor") of the participants at first location 120A. Based on the identified active participant, server device 101 may adjust video stream 140A, such as by zooming on the identified active participant, cropping video stream 140A to focus on the active participant, etc. In addition, server device 101 may adjust audio data associated with video stream 140A (e.g., through automatic gain control) to highlight the voice of the active participant.

In these and other implementations, server device 101 may detect a physical movement by one or more participants at first location 120A. Based on the detected physical movement, server device 101 may adjust video stream 140A. In various scenarios, server device 101 may increase the display size and/or enhance the resolution of 140A, e.g., to provide a clearer, smoother representation of the physical movement. In other scenarios, server device 101 may decrease the display size and/or diminish the resolution of 140A, e.g., to conserve bandwidth consumption resulting from transmitting higher resolution video of physical movement.

In some situations, a participant (such the lone participant at third location 120C) may display textual content using the camera of client device 102C. For example, the participant may use the camera of client device 102C to show the participants at the remaining locations a document, graph, or other text-based information. In such situations, server device 101 may detect the textual content in video stream 140C, and adjust video stream 140C accordingly. In some examples, server device 101 may increase the display size and/or enhance the resolution of video stream 140C, in order to provide a clearer, more legible depiction of the textual content. In other examples, server device 101 may decrease the display size and/or diminish the resolution of video stream 140, in order to prevent bandwidth wastage caused by a higher resolution video depiction of static material, such as textual content.

In the example of second location 120B, video management module 114 may reduce the display size and resolution of video stream 140B before distributing video 140B to the remaining locations. As discussed, client device 102B may be a mobile computing device, such as a smartphone or a tablet computer. Frequently, users operate mobile computing devices within arm's length. Thus, video camera 104B (of client device 102B) may be situated within close proximity to the sole participant at second location 120B. To compensate for the close proximity of the captured video data, video management module 114 may reduce the display size and resolution of video stream 140B before distributing video stream 140B to the remaining locations.

Video management module 114 may implement the techniques of this disclosure to mitigate differences in perceivable detail of various video feeds. In some examples, video management module 114 may increase the display size and resolution of video feed 140A, thus adding perceivable detail to the captured video of all eight participants at first location 120A. Conversely, video management module 114 may reduce the display size of video feed 140B, preventing video associated with the sole user at second location 120B from appearing excessively large and detailed. In this manner, techniques of this disclosure may adjust display sizes and resolutions of video streams, thus providing comparable perceivable visual detail to video streams from different types of locations.

In the example of third location 120C, video management module 114 may implement techniques of this disclosure to adjust video stream 140C in additional ways to those described earlier. As discussed, third location 120C may be a conference room. As shown in FIG. 1, third location 120C may host a sole participant. Additionally, the sole participant may choose to sit at a relatively far distance from video camera 104C (of client device 102C), as illustrated in FIG. 1. In this example, video management module may adjust video stream 140C by zooming in toward the sole participant, in addition to making other adjustments to video stream 140C. By zooming in on the sole participant at third location 120C, video management module 114 may eliminate unnecessary portions of video stream 140C (e.g., empty seats allocated for additional participants, etc.). After zooming in to the sole participant at third location 120C, video management module 114 may make other adjustments to video stream 140C, such as reducing the display size and resolution to better suit a sole participant, and/or cropping out portions of the captured video so as to focus on the sole participant.

In some implementations, video management module 114 may cause video camera 104C of client device 102C to zoom in to the sole participant before generating video stream 140C instead of video management module 114 altering the received video stream by at least zooming in on the sole participant. In some instances, video management module 114 may adjust the zoom settings dynamically, as participants enter and leave third location 120C. For example, an additional participant may enter third location 120C, and sit relatively close to video camera 104C of client device 102C. In this event, video management module 114 may zoom out from the original participant (shown in FIG. 1) to capture sufficiently detailed video of the additional participant. If one of the participants leaves third location 120C, video management module 114 may zoom in to capture sufficiently detailed video of the remaining participant. To recognize the arrival and departure of participants, video management module 114 may utilize one or more of face detection, motion detection, and other technologies.

Additionally, video management module 114 may cause one or more of client device 102 to adjust a video feed before sending the video feed to server device 101. For example, video management module 114 may send an instruction to client device 102A to adjust video stream 140A, based on various criteria. In some instances, video management module 114 may send such an instruction based on the display capabilities of other client devices in the communication session. For example, video management module 114 may determine that client device 102B has relatively low display capabilities in comparison to the resolution and/or display size of video stream 140A sent by client device 102A. Based on the determination, video management module 114 may send an instruction to client device 102A to reduce one or both of the resolution and/or display size of video stream 140A before sending video stream 140 to server device 101. In other implementations, one or more of client devices 102 may be equipped with respective video management modules, enabling client devices 102 to adjust video streams 140 before sending video streams 140 to server device 101. In this manner, techniques of this disclosure may be implemented on client devices, enabling adjustment of video feeds at the client device before the video feeds are provided to a server device for distribution to other client devices in the communication session.

While described with respect to the video portion of media streams thus far, server device 101 may also implement the techniques of this disclosure to adjust audio streams. Server device 101 may adjust audio streams for a variety of purposes, including optimization of bandwidth usage, reduction of background noise, improving audibility of certain speakers' voices, etc. Server device 101 may adjust audio streams received from client devices 102 instead of, or in addition to, adjusting video streams received from client devices 102. In some illustrative examples, client device 102B (a mobile computing device) may transmit only audio data and not video data to server device 101. In one such example, client device 102B may not be equipped with a video capture device. In another such example, client device 102B may be equipped with a video capture device, but may not capture and/or transmit video data due to various conditions (e.g., insufficient network bandwidth, low battery power, etc.). Conversely, client device 102A may consistently transmit a media stream that includes both video and audio data. In both examples, server device 101 may implement techniques of this disclosure to adjust the received audio data before distributing the audio data to client devices 102.

In some scenarios, server device 101 and/or one or more of client devices 102 may implement a process known as "automatic gain control" in order to optimize the audibility of one or more participants. For example, client device 102A may implement automatic gain control to amplify the voice of a participant who is seated relatively far from a microphone of client device 102A. In another example, server device 101 may implement automatic gain control on audio data received from client device 102B. In this example, server device 101 may determine that the audio data received from client device 102B is faint, and that the remaining participants may more clearly hear the audio if server device 101 amplifies the audio data by automatic gain control. In some instances, server device 101 may need to perform automatic gain control because one or more client devices (e.g., client device 102B) may not be equipped to perform automatic gain control before transmission of the audio data. In other instances, server device 101 may perform automatic gain control regardless of whether or not the sending client device has already performed automatic gain control on the audio data.

Server device 101 may also adjust or manipulate received audio data in other ways. In one example, server device 101 may implement voice recognition technology to identify those participants whose voices are heard in longer sequences and/or on more occasions than others. By identifying these voices, server device 101 may isolate those participants who are more active than others in the virtual meeting. Based on which participants are more active, server device 101 may prioritize the audio identified with each participant. For example, if server device 101 identifies concurrent voice activity in the received audio streams, server device 101 may amplify the voices associated with more active participants. Additionally, server device 101 may diminish the volume of voices identified with less active participants or voices that have not yet been identified by server device 101. In this and other examples, one or more client devices 102 may be equipped to perform the voice recognition and prioritization described herein.

Some existing video conferencing systems implement a peer-to-peer architecture. In a peer-to-peer architecture, client devices send and receive media directly, i.e. the client devices may not rely on a server to relay media. Thus, a client device at each location sends media (e.g., a video stream and/or audio stream) to all the other client devices in the virtual meeting. Similarly, the client device receives media streams directly from all the other client devices. Peer-to-peer architectures may be advantageous in some scenarios, while disadvantageous in others. For example, when two or more client devices are in close physical proximity to one another, a peer-to-peer architecture may improve the efficiency of a virtual meeting, e.g., by offering faster data transfer rates. In these scenarios, using a centralized (server-based) architecture may hamper efficiency and performance on some client devices, as the server may be physically distant from one or more of the client devices.

In one example, server device 101 may detect that client device 102A is physically closer to client device 102B than to server device 101. In this example, server device 101 may perform a "peer-to-peer handoff" of client devices 102A-B. In other words, server device 101 may cause client devices 102A-B to switch to a peer-to-peer connection. By handing off to peer-to-peer architectures based on physical distances between client devices, server device 101 may optimize transfer speeds between client devices, while saving computing resources for only those connections better suited to a centralized network architecture. Server device 101 may discern the distance between two or more of client devices 102 based on such data as IP addresses, sending a signal to each of client devices 102 and measuring the time before server device 101 receives a response (e.g., "pinging" each of client devices 102), and other methods known in the art. In this manner, techniques of this disclosure may improve efficiency and conserve bandwidth by handing off between server-based and peer-to-peer architectures based on the physical distance between client devices.

In some examples, server 101 may further employ "regional reflectors" (not shown for ease of illustration purposes) to more efficiently host and administer the virtual meeting. A regional reflector may be a second server device to which server device 101 delegates certain functionalities. More specifically, server device 101 and client devices 102 may not all be in close proximity to one another. In one illustrative example, server device 101 and client device 102A may be situated in a first region (e.g., North America), while client devices 102B and 102C may be in a second region (e.g., Europe). In this example, server device 101 may use a regional reflector situated in Europe to receive and send video streams pertinent to client devices 102B and 102C. Server device 101 may continue to perform various hosting functionalities (e.g., authenticating new client devices to join the virtual meeting, etc.), but may use the regional reflector to perform certain functionalities specific to client devices 102B and 102C. In this manner, server device 101 may implement techniques of this disclosure to alleviate delays, inefficiencies, and bandwidth wastage through the use of regional reflectors.

In some examples, server 101 may use interconnected reflectors (e.g., multiple layers of regional reflectors) to further improve efficiency and bandwidth usage. In the example described above, client devices 102B and 102C may be in different parts of Europe (e.g., Sweden and Spain, respectively). In this example, server 101 may use a first regional reflector in Europe through which to communicate with both of client devices 102B and 102C. Server 101 may use the first regional reflector owing to a limited number of network infrastructures (e.g., cables) connecting North America to Europe. If the first regional reflector is closer to Sweden than to Spain, the first regional reflector may then receive and transmit video streams from/to client device 102B. In turn, the first regional reflector may use a second regional reflector (in or near Spain) to receive and transmit video streams from/to client device 102C. Through the use of interconnected reflectors, techniques of this disclosure may optimize and improve efficiency of virtual meetings even when client devices are physically distant from one another and from the main server (e.g., server 101).

Figure 2:
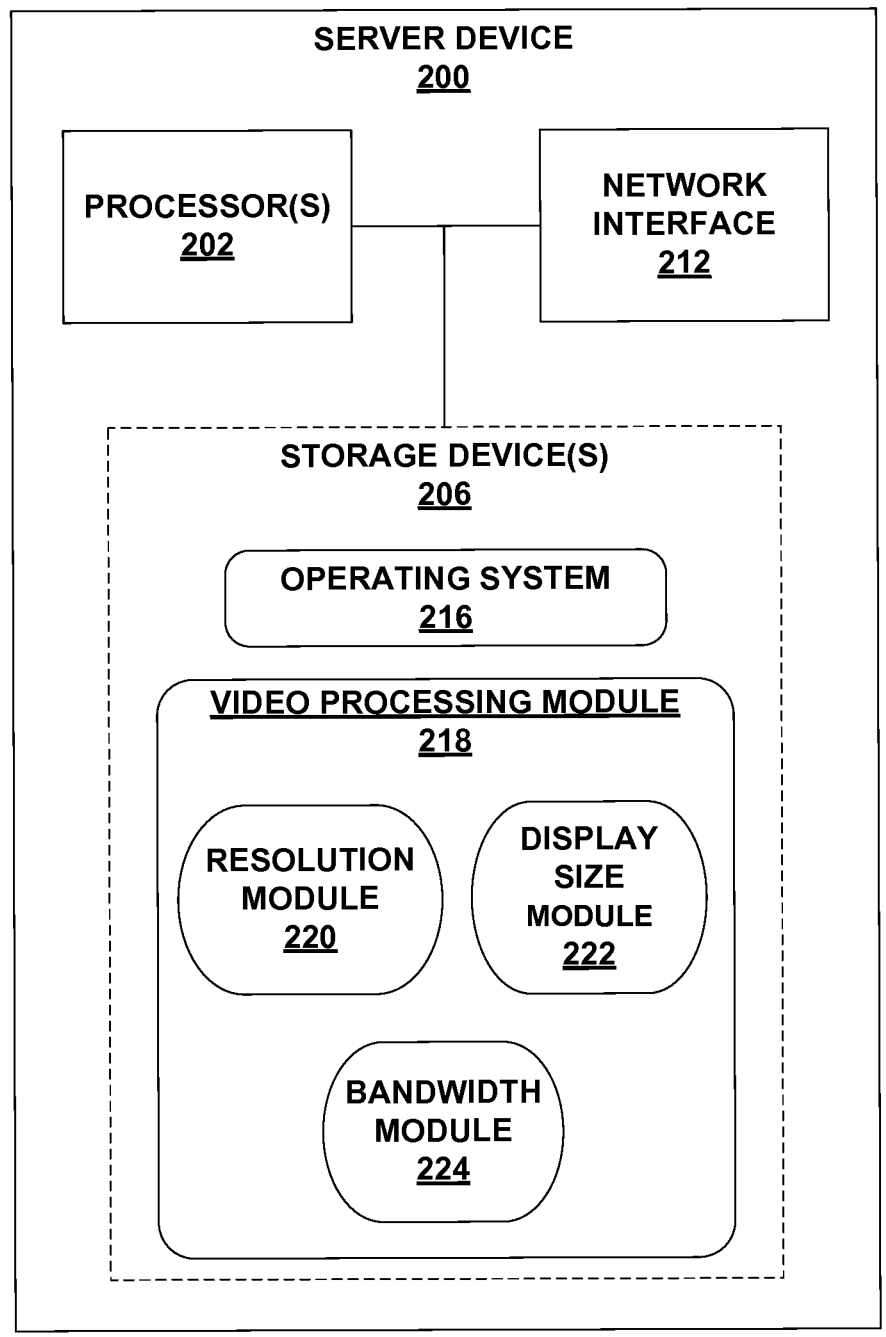
FIG. 2 is a block diagram illustrating an example of a server, in accordance with one or more aspects of this disclosure.

FIG. 2 is a block diagram illustrating an example of a server, in accordance with one or more aspects of this disclosure. FIG. 2 illustrates server device 200, which may be one non-limiting example of server device 101 described with respect to FIG. 1. Server device 200 may include one or more processors 202, network interface 212, and one or more storage devices 206, among other components not shown for ease of illustration. Server device 200, and components thereof, may be operable to host and administrate a virtual meeting, such as a video conference, between multiple client devices using a communicative connection, such as a broadband Internet connection, wireless Internet connection, wired Internet connection, etc.

One or more processors 202 may, in some examples, be configured to implement functionality and/or process instructions for execution within server device 200. For example, processors 202 may process instructions stored in or instructions stored on storage devices 206. Such instructions may include components of operating system 216, video processing module 218, or one or more of resolution module 220, display size module 222, and bandwidth module 224.

Network interface 212 may facilitate communication between server device 200 and one or more external devices via one or more networks, such as a wired network, wireless network, etc. Examples of network interface 212 may include a network interface card, such as an Ethernet card, an optical transceiver, a radio frequency transceiver, or any other type of device than can send and receive information. Other examples of such network interfaces may include Bluetooth®, 3G, and WiFi® radios in mobile computing devices as well as USB. In some examples, server device 200 may utilize network interface 212 to wirelessly communicate with one or more external devices such as client device 102A of FIG. 1.

Storage devices 206, in some examples, also include one or more computer-readable storage media. Storage devices 206 may be configured to store larger amounts of information than volatile memory. Storage devices 206 may further be configured for long-term storage of information. In some examples, storage devices 206 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In some examples, server device 200 may have access to a database. The database may be stored to storage devices 206 and/or stored at a remote location accessible via network interface (through methods commonly known as "cloud storage"). The database may include a directory of client devices and information pertinent each client device. For example, the database may include a room size associated with a client device, a default video resolution that a client device captures and/or transmits, a standard display size that client device displays, historical data pertaining to participant counts for a client device, etc.

Operating system 216 may control one or more functionalities of server device 200 and/or components thereof. For example, operating system 216 may facilitate one or more interactions between video processing module 218 and one or more of processors 202, storage device(s) 206, and network interface 212. As shown in FIG. 2 video processing module 218 may include resolution module 220, display size module 222, and bandwidth module 224. Each of input module 220, display size module 222, and bandwidth module 224 may include program instructions that are executable by server device 200, and/or data. For example, bandwidth module 224 may include instructions that cause video processing module 218 executing on server device 200 to perform one or more of the operations and actions described in the present disclosure.

Video processing module 218 may enable server device 200 to implement one or more functionalities described in this disclosure, such as functionalities described with respect to video management module 114 of FIG. 1. In some scenarios, video processing module 218 and components thereof may adjust display sizes and resolutions of video streams received from one or more client devices, and then output the adjusted video streams (e.g., through network interface 212). For example, video processing module 218 may utilize resolution module 220 to enhance or diminish the resolution of a received video stream before retransmission. Similarly, video processing module 218 may utilize display size module to increase or reduce the display size of a received video stream, based on various conditions (e.g., distance between a client site video camera and a sole participant).

As shown in the example of FIG. 2, video processing module 218 may also include bandwidth module 224. Bandwidth module 224 may enable server device 200 to adjust video streams based on amounts of bandwidth available to various client devices in the virtual meeting. For example, bandwidth module 224 may detect the bandwidth available to a client device that is a mobile computing device, such as a smartphone connected by a cellular telecommunication connection that provides data access. When the client device experiences decreased bandwidth (e.g., due to poor connectivity), bandwidth module 224 may cause resolution module 220 to diminish the resolutions of each video stream that server device 200 sends to the client device. In some examples, bandwidth module 224 may also cause server device 200 adjust audio streams before transmission, based on the bandwidth available to a particular client device.

In these and other examples, bandwidth module 224 may cause server device 200 to adjust characteristics of other than display size and resolution of video streams before transmission to client devices. In one example where bandwidth module 224 detects that a client device has insufficient bandwidth, bandwidth module 224 may cause video processing module 218 to omit one or more received video streams from the video stream to be transmitted. For example, bandwidth module 224 may cause video processing module 218 to transmit a video stream that includes video data received from only one client device (thus omitting video data received from the remaining client devices). Video processing module 218 may select the video streams to isolate based on participants' levels of activity, priorities set by an administrator, times when each client device joined the virtual meeting, etc. In some examples, bandwidth module 224 may cause server device 200 to solicit, from participants using a client device with low bandwidth, which specific video data the participants would like to receive. Based on the amount of bandwidth available to the client device, server device 200 may present the participants with options to select one or more video streams to include or omit. Bandwidth module 224 may cause server device 200 to vary the options based on the bandwidth available to the client device. For example, if a client device has slightly diminished bandwidth, server device 200 may permit the corresponding participants to select more than one video streams and/or include video streams of greater display size and/or resolution. Conversely, if a client device has severely diminished bandwidth, server device 200 may only permit the permit the corresponding participants to select a single video stream and/or include video streams of lesser display size and/or resolution. In this manner, bandwidth module 224 may implement the techniques of this disclosure to adjust video streams based on bandwidth available to a particular client device.

In some examples, bandwidth module 224 may discern the bandwidth available to a client device based on the display size and/or resolution of a video stream received from the client device. For example, if server device 200 receives a low resolution from a particular client device, bandwidth module 224 may determine that the particular client device sent the video stream at low resolution because of diminished bandwidth. In this example, bandwidth module 224 may cause server device 200 to send a video stream to the particular client device at a reduced display size and/or bandwidth. Bandwidth module 224 may additionally cause server device 200 to omit certain video data from the video stream to be transmitted to the particular client device, based on the discerned bandwidth.

Figure 3:
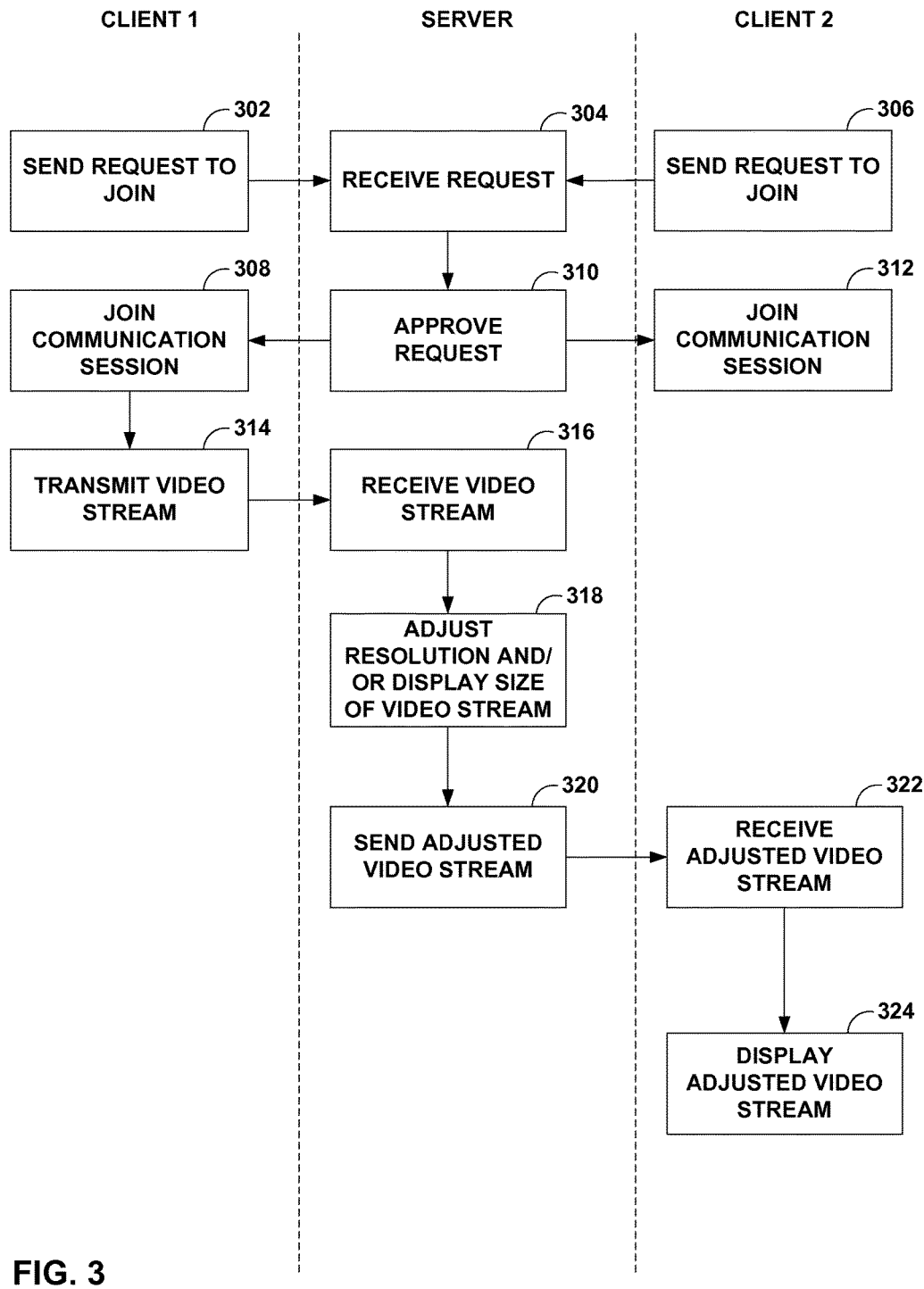
FIG. 3 is a flowchart illustrating a communication session (e.g., video conference) between multiple client devices, hosted by a server that may implement techniques of this disclosure to adjust the display size and resolution of video streams received from the client devices.

FIG. 3 is a flowchart illustrating a communication session (e.g., video conference) between multiple client devices, hosted by a server that may implement techniques of this disclosure to adjust the display size and resolution of video streams received from the client devices. Process 300 may begin when multiple client devices request to join a virtual meeting by sending individual requests to the server. In the specific example of FIG. 3, two client devices may send the requests (302 & 306). The server may receive the requests (304), and approve the requests (310). Based on the server's approval of the requests, each client device may successfully join the communication session (308 & 312).

One or both client devices may then transmit a video stream (sometimes in conjunction with other types of data, such as audio, text, files such as documents, images, etc.) to the server. For ease of illustration purposes, FIG. 3 shows a single client device (client 1) transmitting the video stream (314). Client 1 may transmit the video stream to the server for distribution to the remaining client devices in the communication session (in this instance, client 2).

The server may receive the video stream (316), and adjust one or more aspects of the video stream before forwarding to client 2 (318). More specifically, the server may adjust one or both of the display size and the resolution of the video stream (318). As discussed, the server may adjust the display size and/or resolution based on various factors associated with client 1. For example, the server may enhance the resolution if the server detects multiple participants at the location of client 1. Conversely, the server may diminish the resolution if the server detects that only a single participant is at the location of client 1. Additionally, the server may zoom in to or out of certain portions of the video stream, based on detected distances between the video camera of client 1 and each participant using client 1.

After adjusting the received video stream, the server may send the adjusted video stream to the remaining client devices (320). In the particular example of FIG. 3, the server may send the adjusted video stream only to client 2. In some implementations, the server may also send the adjusted video stream back to the originating client device (e.g., client 1). In this manner, the server may implement techniques of this disclosure to enable the participant(s) using client 1 to view how they appear other to participants in the communication session, such as those participants using client 2. In many such examples, the server may not send audio streams back to the originating client device, to avoid such issues as echo, audio feedback, etc.

Figure 4:
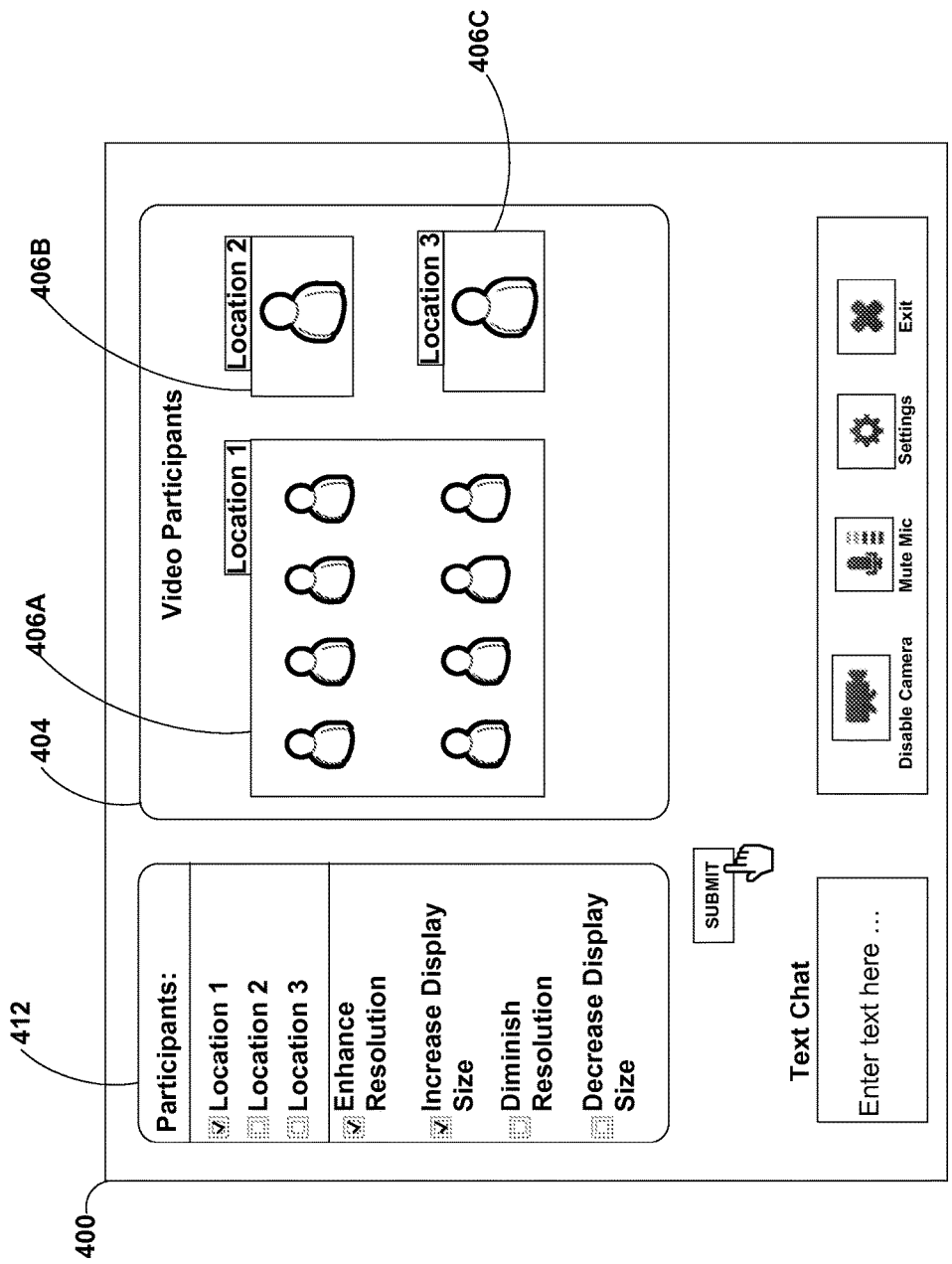
FIG. 4 is a conceptual diagram illustrating details of an example graphical user interface (GUI) displayed by a client device, in accordance with one or more aspects of this disclosure.

FIG. 4 is a conceptual diagram illustrating details of an example graphical user interface (GUI) displayed by a client device, in accordance with one or more aspects of this disclosure. FIG. 4 illustrates GUI 400, which includes various components. One or more of the components of GUI 400 may provide interactive capabilities, i.e., these components may enable a user to enter input, and may provide updates and/or responses based on the input. In the example of FIG. 4, GUI 400 includes a display adjustment menu 412, first participant display 406A, second participant display 406B, and third participant display 406C. GUI 400 also includes other communication-related components, such as a text chat module and buttons to alter user-controlled settings, which are not called out for ease of discussion.

While not drawn to scale, one example of how adjusted video streams may appear on a receiving client device is shown in FIG. 4. For example, first participant display 406A has a larger display size than each of second participant display 406B and third participant display 406C. As discussed, a server or client device may adjust first participant display 406A to have a larger display size, based on detecting eight participants at location 1. Similarly, second participant display 406B and third participant display 406C may be adjusted to a smaller display size, based on a detection that only a single participant is at each of location 2 and location 3.

GUI 400 may also enable a user to adjust the display size and/or resolution of one or more of first participant display 406A, second participant display 406B, and third participant display 406C (collectively, "participant displays 406"). For example, a user may select one or more of participant displays 406 and select options to adjust the corresponding display size(s) and/or resolution(s). As shown, display adjustment menu 412 may include checkboxes corresponding to each of participant displays 406. In the example of FIG. 4, the checkboxes identify each of participant displays 406 based on their respective locations. A user may select a checkbox in a variety of ways. In an example where GUI 400 is provided by a mobile computing device with a touchscreen or presence-sensitive display, a user may place a cursor over a particular checkbox using a finger or stylus, and tap the display to select the checkbox. In examples where GUI 400 is displayed on a traditional computing device, such as a desktop or laptop computer, the user may select a checkbox by placing the cursor over a checkbox using a mouse, touchpad, etc. and then clicking or tapping.

In the example display adjustment menu 412 shown in FIG. 4, a user selected first participant display 406A for display adjustment by checking the box corresponding to location 1. In other examples, a user may select another one of participant displays 406, or more than one of participant displays 406 for display adjustment. After selecting one or more of participant displays 406, the user may select one or more ways to adjust properties of the corresponding displays. More specifically, the user may choose between enhancing and diminishing the resolution of the selected display(s) of participant displays 406. Similarly, the user may choose between increasing and decreasing the display size of the selected display(s) of participant displays 406. The user may choose to adjust one or both of the resolution and the display size. In the example of FIG. 4, the user has chosen to enhance the resolution as well as increase the display size of first participant display 406A.

In some implementations, the client device displaying GUI 400 may request a sending server to adjust a video stream according to the user's choices. In other implementations, the client device that displays GUI 400 may request an originating client device to adjust a video stream according to the user's choices. In still other implementations, the client device displaying GUI 400 may itself adjust a received video stream before displaying the corresponding participant display. In this manner, techniques of this disclosure may enable a participant of a virtual meeting to adjust the display size and/or resolution of video displays associated with other participants in the virtual meeting.

Figure 5:
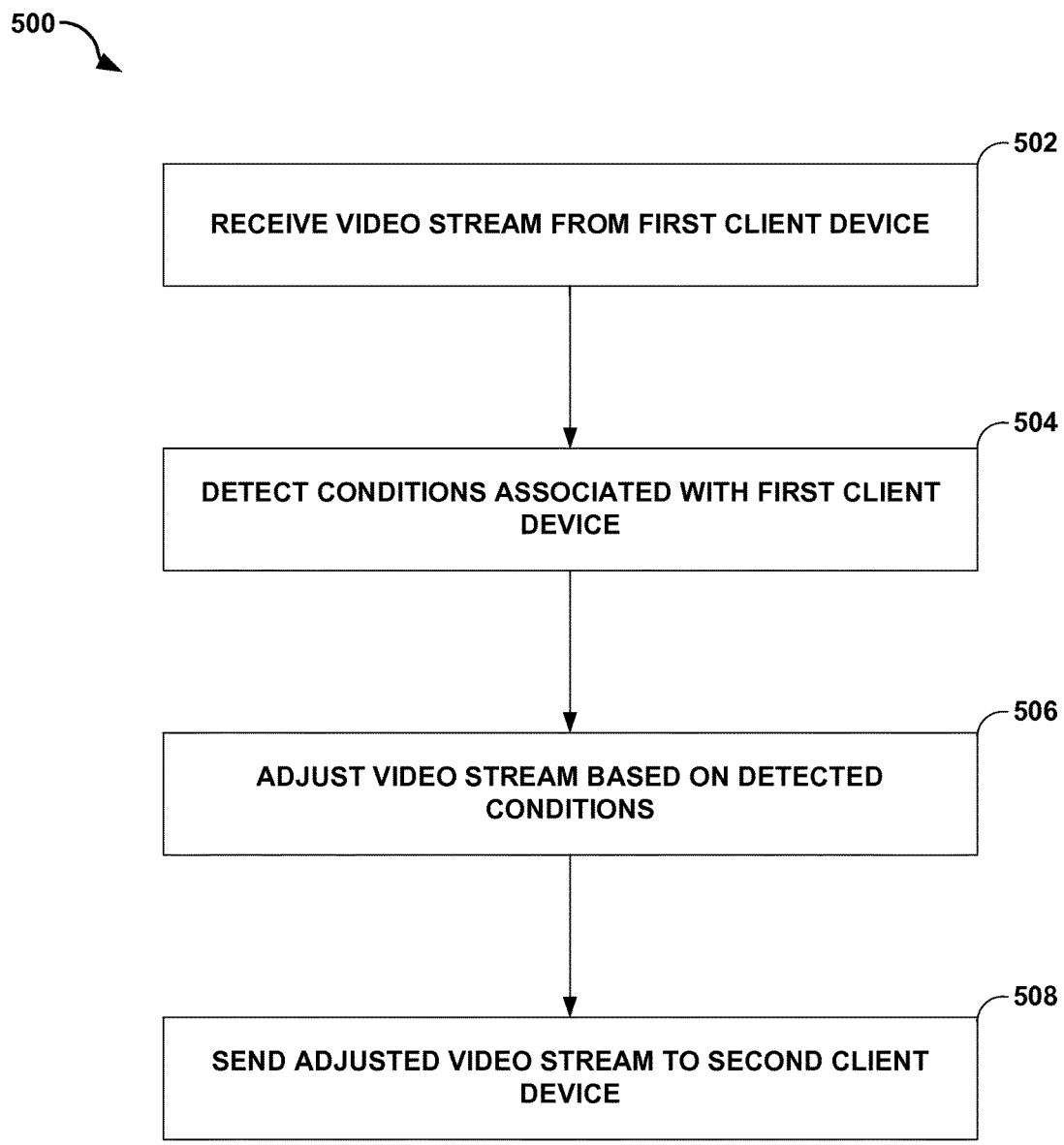
FIG. 5 is a flowchart illustrating an example operation of a computing device in accordance with one or more aspects of this disclosure.

FIG. 5 is a flowchart illustrating an example operation of a computing device in accordance with one or more aspects of this disclosure. Process 500 may be performed by one or more computing devices described herein, such as server device 101 of FIG. 1 and server device 200 of FIG. 2. For ease of discussion, process 500 will be described with respect to server device 101 and client devices 102A and 102B of FIG. 1.

Server device 101 receives a video stream (e.g., video stream 140A) from a first client device, such as client device 102A (502). Server device 101 may receive video stream 140A while hosting a virtual meeting (e.g., video conference) between client devices 102A and 102B. Server device 101 may detect one or more conditions associated with client device 102A (504). In one example, server device 101 may detect a participant count at first location 120A, using face detection techniques. In this and other examples, server device 101 may detect a room size associated with first location 120A. In another example, server device 101 may detect a distance from the video camera of client device 102A to one or more of the participants at first location 120A. In yet another example, server device 101 may detect an available bandwidth of client device 102A.

Server device 101 may detect conditions associated with client device 102A in a variety of ways. In some instances, server device 101 may include capabilities (e.g., as part of video management module 114) to analyze the received video stream to detect the conditions. In other instances, server device 101 may request relevant conditions from client device 102. In still other instances, client device 102A may send one or more notifications to server device 101 to indicate relevant conditions.

Server device 101 may adjust video stream 140A based on the detected conditions (506). As discussed, server device 101 may adjust one or both of the display size and the resolution of video stream 140A based on the detected conditions. For example, server device 101 may increase the display size and/or enhance the resolution of video stream 140A based on a detection of eight participants at first location 120A. In another example, server device 101 may decrease the display size and/or diminish the resolution of video stream 140A based on detecting that the available bandwidth of client device 102A has deteriorated. In some implementations, server device 101 may adjust the display size and/or resolution of video streams 140 based on a network connection type associated with respective client device 102. For instance, server device 101 may increase the display size and/or enhance the resolution of video stream 140A if server device 101 detects that client device 102A is associated with a wired Ethernet connection or a wireless network connection commonly referred to as WiFi®. Conversely, server device 101 may decrease the display size and/or diminish the resolution of video stream 140B if server device 101 detects that client device 102B is connected via a cellular network connection, including so-called "3G" and "4G" connections.

Server device 101 may send the adjusted video stream to a second client device, such as client device 102B (508). In other instances, server device 101 may send the adjusted video stream to multiple client devices, such as client devices 102B and 102C. In certain implementations, server device 101 may also send the adjusted video stream back to the originating client device, namely client device 102. In this manner, server device 101 may implement the techniques of this disclosure to auto-size and/or adjust the resolution of a received video stream before sending the video stream to client devices in a virtual meeting.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

In some examples, any of the described software units, modules or components may be executed as one or more distributed processes on one or more computing devices of a distributed system. In this way, workloads of any of the described software units, modules or components may be distributed across the distributed system for processing. In one example, a distributed system may include multiple autonomous computers that communicate through one or more communication channels, such as a computer network, to perform techniques implemented by the software units, modules or components.

As used throughout this disclosure, headings are included to improve the clarity of the disclosure and are not used to define separate embodiments. In some instances, features of various examples may be combined and/or used from among multiple headings. Various examples have been described. These and other examples are within the scope of the following claims.

What is claimed is:

1. A method performed by a computing device having at least one processor, the method comprising:
    receiving, by the computing device, a first video stream from a first client device of a plurality of client devices, wherein the computing device is communicatively coupled to each client device of the plurality of client devices;
    detecting, by the computing device, a participant count associated with the first client device based on the first video stream from the first client device;
    based on the participant count associated with the first client device, adjusting, by the computing device, the first video stream wherein the adjusting comprises one of:
        if the participant count is greater than one, increasing one or more of a display size and a resolution of the first video stream to add perceivable detail to the first video stream; and
        if the participant count is one, reducing the display size of the first video stream;
    receiving, by the computing device, a second video stream from a second client device of the plurality of client devices;
    adjusting, by the computing device, at least one of video stream display size or video stream resolution of the second video stream such that a difference in perceivable detail between the adjusted second video stream and the adjusted first video stream is minimized; and
    sending, by the computing device, the adjusted first video stream and the adjusted second video stream to at least one client device of the plurality of client devices.

2. The method of claim 1, further comprising:
    detecting a changed participant count associated with the first client device; and
    readjusting the adjusted first video stream based at least in part on the changed participant count.

3. The method of claim 1, wherein detecting the participant count associated with the first client device includes performing facial detection.

4. The method of claim 1, wherein detecting the participant count associated with the first client device comprises receiving one or more notifications from the first client device.

5. The method of claim 1, further comprising:
    determining, by the computing device, that a physical proximity between the first client device and the second client device is suited to a peer-to-peer connection; and
    based on the determination, establishing, by the computing device, the peer-to-peer connection between the first client device and the second client device, wherein the peer-to-peer connection enables the first client device and the second client device to communicate directly with each other.

6. The method of claim 1, wherein adjusting at least one of the first video stream or the second video stream is based at least in part on a user request received from one of the plurality of client devices.

7. A system comprising:
    one or more processors;
    a network interface operable to receive a first video stream from a first client device of a plurality of client devices and a second video stream from a second client device of the plurality of client devices, wherein the system is communicatively coupled to each client device of the plurality of client devices and is operable to send an adjusted video stream to at least one client device of the plurality of client devices; and
    a non-transitory storage device with a video management module stored thereon, the video management module including software instructions that, when executed by the one or more processors, cause the one or more processors to perform operations including:
        receiving a first video stream from a first client device of a plurality of client devices, wherein the system is communicatively coupled to each client device of the plurality of client devices;
        detecting a participant count associated with the first client device based on the first video stream from the first client device;
        based on the participant count associated with the first client device, adjusting the first video stream wherein the adjusting comprises one of:
            if the participant count is greater than one, increasing one or more of a display size and a resolution of the first video stream to add perceivable detail to the first video stream; and
            if the participant count is one, reducing the display size of the first video stream;
        receiving a second video stream from a second client device of the plurality of client devices;
        adjusting at least one of video stream display size or video stream resolution of the second video stream such that a difference in perceivable detail between the adjusted second video stream and the adjusted first video stream is minimized; and sending the adjusted first video stream and the adjusted second video stream to at least one client device of the plurality of client devices.

8. The system of claim 7, wherein the operations further comprise:
   detecting a changed participant count associated with the first client device; and
   readjusting the adjusted first video stream based at least in part on the changed participant count.

9. The system of claim 7, wherein detecting the participant count associated with the first client device includes performing facial detection.

10. The system of claim 7, wherein detecting the participant count associated with the first client device comprises receiving one or more notifications from the first client device.

11. The system of claim 7, wherein the operations further comprise:
   determining that a physical proximity between the first client device and the second client device is suited to a peer-to-peer connection; and
   based on the determination, establishing the peer-to-peer connection between the first client device and the second client device, wherein the peer-to-peer connection enables the first client device and the second client device to communicate directly with each other.

12. The system of claim 7, wherein adjusting at least one of the first video stream or the second video stream is based at least in part on a user request received from one of the plurality of client devices.

13. A non-transitory computer readable medium having stored thereon software instructions that, when executed by one or more processors of a system, cause the one or more processors to perform operations including:
   receiving a first video stream from a first client device of a plurality of client devices, wherein the system is communicatively coupled to each client device of the plurality of client devices;
   detecting a participant count associated with the first client device based on the first video stream from the first client device;
   based on the participant count associated with the first client device, adjusting the first video stream wherein the adjusting comprises one of:
      if the participant count is greater than one, increasing one or more of a display size and a resolution of the first video stream to add perceivable detail to the first video stream; and
      if the participant count is one, reducing the display size of the first video stream;
   receiving a second video stream from a second client device of the plurality of client devices;
   adjusting at least one of video stream display size or video stream resolution of the second video stream such that a difference in perceivable detail between the adjusted second video stream and the adjusted first video stream is minimized; and
   sending the adjusted first video stream and the adjusted second video stream to at least one client device of the plurality of client devices.

14. The non-transitory computer readable medium of claim 13, wherein the operations further comprise:
   detecting a changed participant count associated with the first client device; and
   readjusting the adjusted first video stream based at least in part on the changed participant count.

15. The non-transitory computer readable medium of claim 13, wherein detecting the participant count associated with the first client device includes performing facial detection.

16. The non-transitory computer readable medium of claim 13, wherein detecting the participant count associated with the first client device comprises receiving one or more notifications from the first client device.

17. The non-transitory computer readable medium of claim 13, wherein the operations further comprise:
   determining that a physical proximity between the first client device and the second client device is suited to a peer-to-peer connection; and
   based on the determination, establishing the peer-to-peer connection between the first client device and the second client device, wherein the peer-to-peer connection enables the first client device and the second client device to communicate directly with each other.

18. The non-transitory computer readable medium of claim 13, wherein adjusting at least one of the first video stream or the second video stream is based at least in part on a user request received from one of the plurality of client devices.

* * * * *